United States Patent
Nusser et al.

(10) Patent No.: US 7,093,296 B2
(45) Date of Patent: Aug. 15, 2006

(54) SYSTEM AND METHOD FOR DYNAMICALLY EXTENDING A DRM SYSTEM USING AUTHENTICATED EXTERNAL DPR MODULES

(75) Inventors: Stefan Nusser, Los Altos, CA (US); Eckhart Koeppen, San Jose, CA (US); James C. Mahlbacher, Lake Worth, FL (US); David Medina, Coral Springs, FL (US); Luca Contessa, Boca Raton, FL (US)

(73) Assignee: International Business Machines Corporation, Armonk, NY (US)

( * ) Notice: Subject to any disclaimer, the term of this patent is extended or adjusted under 35 U.S.C. 154(b) by 847 days.

(21) Appl. No.: 10/051,344

(22) Filed: Jan. 18, 2002

(65) Prior Publication Data

US 2003/0140243 A1   Jul. 24, 2003

(51) Int. Cl.
*G06F 21/22* (2006.01)
(52) U.S. Cl. .............................. 726/26; 726/18; 726/6
(58) Field of Classification Search ................ 713/200
See application file for complete search history.

(56) References Cited

U.S. PATENT DOCUMENTS

| 6,226,618 | B1 | 5/2001 | Downs et al. |
| 6,915,425 | B1* | 7/2005 | Xu et al. ..................... 713/165 |
| 2002/0174125 | A1* | 11/2002 | Lucovsky et al. .......... 707/100 |
| 2002/0188854 | A1* | 12/2002 | Heaven et al. .............. 713/186 |

\* cited by examiner

*Primary Examiner*—Gilberto Barren, Jr.
*Assistant Examiner*—Venkat Perungavoor
(74) *Attorney, Agent, or Firm*—Jon A. Gibbons; Fleit, Kain, Gibbons, Gutman, Bongini & Bianco P.L.

(57) ABSTRACT

A rights management module controls access to a data set by processing requests for flexibly defined types of access to the data set and determines if the requested access may be granted. The requester's right for the requested type of access is verified by a verification module that may be part of the rights management core or verified through expansion rights verification modules. Extension verification modules may be contained within the data set itself or obtained from a separate store. Extension verification modules are authenticated by the rights management core.

27 Claims, 6 Drawing Sheets

```
<xsd:element name="accessControl" minOccurs="0">
  <xsd:complexType>
    <xsd:sequence>
      <xsd:element name="userAuthentication" minOccurs="0">
        <xsd:complexType>

<xsd:sequence>
            <xsd:element name="authority">
              <xsd:simpleType>
                <xsd:restriction base="xsd:string">
                  <xsd:minLength value="1"/>
                  <xsd:maxLength value="1024"/>
                </xsd:restriction>
              </xsd:simpleType>
            </xsd:element>

<xsd:element name="user" minOccurs="0" maxOccurs="unbounded">
              <xsd:simpleType>
                <xsd:restriction base="xsd:string">
                  <xsd:minLength value="1"/>
                  <xsd:maxLength value="1024"/>
                </xsd:restriction>
              </xsd:simpleType>
            </xsd:element>

<xsd:element name="group" minOccurs="0" maxOccurs="unbounded">
              <xsd:simpleType>
                <xsd:restriction base="xsd:string">
                  <xsd:minLength value="1"/>
                  <xsd:maxLength value="1024"/>
                </xsd:restriction>
              </xsd:simpleType>
            </xsd:element>

<xsd:element name="authData" minOccurs="0">
              <xsd:simpleType>
                <xsd:restriction base="xsd:string">
                  <xsd:minLength value="1"/>
                  <xsd:maxLength value="1024"/>
                </xsd:restriction>
              </xsd:simpleType>
            </xsd:element>
          </xsd:sequence>

<xsd:attribute name="authScheme" use="required">
            <xsd:simpleType>
              <xsd:restriction base="xsd:string">
                <xsd:maxLength value="20"/>
                <xsd:minLength value="1"/>
              </xsd:restriction>
            </xsd:simpleType>
          </xsd:attribute>

<xsd:attribute name="downloadCheck" use="required">
            <xsd:simpleType>
              <xsd:restriction base="xsd:string">
                <xsd:enumeration value="none"/>
                <xsd:enumeration value="installed"/>
              </xsd:restriction>
            </xsd:simpleType>
          </xsd:attribute>
        </xsd:complexType>
      </xsd:element>
    </xsd:sequence>
  </xsd:complexType>
</xsd:element>
```

```
<accessControl>
<userAuthentication authScheme = "WinNT" downloadCheck="installed">
<authority>EMMS</authority>
<user>nusser</user>
<user>koeppen</user>
<user>mahlbacher</user>
<user>medina</user>
<user>contessa</user>
<group>EMMS Testers</group>
</userAuthentication>
</accessControl>
```

SYSTEM AND METHOD FOR DYNAMICALLY EXTENDING A DRM SYSTEM USING AUTHENTICATED EXTERNAL DPR MODULES

BACKGROUND OF THE INVENTION

1. Field of the Invention

This invention generally relates to the field of managing rights to access secure digital data modules, and more particularly relates to an extensible method and system to enable specification of different types of digital property rights to secure digital data modules.

2. Description of Related Art

The developments in electronic communications and digital processing of data that comprise multi-media presentations have greatly increased the distribution of multi-media presentations in digital form. Digital audio, including commercial music recordings, have been distributed on Compact Disks (CDs), for some time, but the inability to practically store or communicate these relatively large data sets has precluded widespread copying and distribution of digitized media. Advances in economical storage, high-speed communications and playback of a large amount of digital data has led to digitizing of video productions, including motion pictures, and distributing data sets that contain these types of productions on Digital Video Disks (DVDs) as well as via electronic communications. Technology advances have also allowed the practical copying of these digital multi-media data sets onto writable media or the communications of these data sets among numerous people. The ability to reproduce original copies of digitized multimedia presentations, coupled with the recent ability to conveniently store and/or communicate the data, has lead to an increase in the copying, pirating and unauthorized sharing of digitized multi-media presentations. This unauthorized copying and distribution of digitized multi-media presentations has resulted in large losses to the owners of the copyrights in those presentations.

Various techniques have been used to try to prevent unauthorized copying of multi-media presentations. The data set that comprises the multi-media presentation, the media data set, is encrypted using the various techniques known in the art. Encryption of the media data set has limited effectiveness since the equipment that "plays back" or presents the multi-media presentation to a user must decrypt the media data set to allow playback, thereby requiring dissemination of the encryption technique to all product manufacturers. The commercial grade encryption techniques are also subject to development of decryption algorithms. The encryption technique used for video DVDs, for example, has been compromised by public release of a decryption algorithm used in DVD players. The publicly owned base of existing DVD players precludes changing the encryption algorithms used for that media once an encryption technique is compromised. Encryption protection by itself in existing player systems is also limited to authorizing access to the media data set and is not able to provide flexible limitations on the types of usage rights that may be granted to the media data set. Different types of usage rights that an owner of a media data set is interested in controlling include the right to modifying the data, immediate access to the entire media data set instead of progressive access over the course of the multi-media presentation, or access to permit deletion of parts of the media data set. Encryption of other types of data, such as a database or financial document, similarly fails to provide the ability to control the type of accesses or usages that may be authorized for the data.

Alternative protection techniques have been developed which support controlling different types of usage rights for a media data set. These systems, referred to as Digital Rights Management (DRM) Systems, are able to restrict access to data sets by limiting authorization to one or more types of usages of a data set in response to specified usage conditions. Access control in these systems is controlled through specified Digital Property Rights (DPRs). An example of a DPR is a right to only read a particular media data set for a specified number of times. Such a DPR may be used to provide a free or low cost demonstration of the multi-media data set. Existing systems support a variety of conditions on usage of the media data set and those conditions may be specified on a remote license server, but the available types of usages that may be authorized are fixed by the implementation and may not be flexibly varied by the owners of the copyright on a media data set.

Therefore a need exists to overcome the problems with the prior art as are discussed above, and particularly for a DRM system which provides flexibility to digital multi-media copyright holders in defining the type of usage rights that may be granted to their media and the usage conditions which must be satisfied prior to granting those types of rights.

SUMMARY OF THE INVENTION

According to a preferred embodiment of the present invention, a system and method for dynamically extending a DRM system using authenticated external DPR modules is a system and method which identifies an associated extension rights control module that is separate from a Digital Rights Management core. The associated extension rights control module is used to generate an authorization for a desired type of access to a data set. Once the associated extension rights control module is identified, the system and method then request an authorization for the desired type of access to the data set from the associated extension rights control module. If the right for the desired type of access is to be granted, an authorization is received from the associated extension rights control module and the desired type of access is granted.

BRIEF DESCRIPTION OF THE DRAWINGS

FIG. 2A is an example XML schema of a of DPR rights for a media object, in accordance with an example embodiment of the present invention.

DESCRIPTION OF THE PREFERRED EMBODIMENTS

Preferred embodiments of the present invention will be described in detail hereinbelow with reference to the attached drawings.

The present invention, according to a preferred embodiment, overcomes problems with the prior art by allowing a data access manager module to incorporate extension rights verification modules that determine whether to grant one or more of a variety of usage rights for a data object. The extension rights verification modules are configured to check for satisfaction of a set of zero or more usage conditions in order to determine whether to grant or deny the usage right for the data being protected. Examples of usage rights granted by the extension rights verification modules include, but are not limited to, one-time access, execution access for a software application, modification of the data within the data object or deletion of some or all of the data within the data object.

The present invention is related to end user software applications as described in the co-pending non-provisional U.S. patent application Ser. No. 09/938,401 now [Pending], application entitled "Method and System of Preventing Unauthorized Rerecording of Multimedia Content", filed Aug. 23, 2001 with inventors Michael G. Lisanke, Kenneth L. Milsted, Stefan Nusser, et al., commonly assigned herewith to International Business Machines Corporation and is hereby incorporated by reference in its entirety. The example embodiments illustrated below are based upon a Digital Rights Management (DRM) system which enforces Digital Property rights (DPRs). The DRM system of the example embodiment is used to grant or deny various types of usage rights to a data set that contains digitized and encrypted multi-media content, such as audio and/or video. The multi-media content used in conjunction with the example embodiments are distributed electronically or stored on data storage devices that are distributed to various users. The various users receiving the multi-media content then utilize a DRM system in accordance with the teachings of this specification to control access in accordance with different types of usage rights for the multi-media data content. The DRM system of the example embodiment ensures that the specified set of usage conditions for the requested type of usage right for the data set containing the multi-media data is satisfied prior to decryption of the data set and delivery of the data set to software components which process the data. It is clear that the present invention is applicable to controlling usage of any type of any data whether in analog or digital form including, but not limited, to multi-media, video, sound, text, databases, documents or software application programs.

Figure 1:
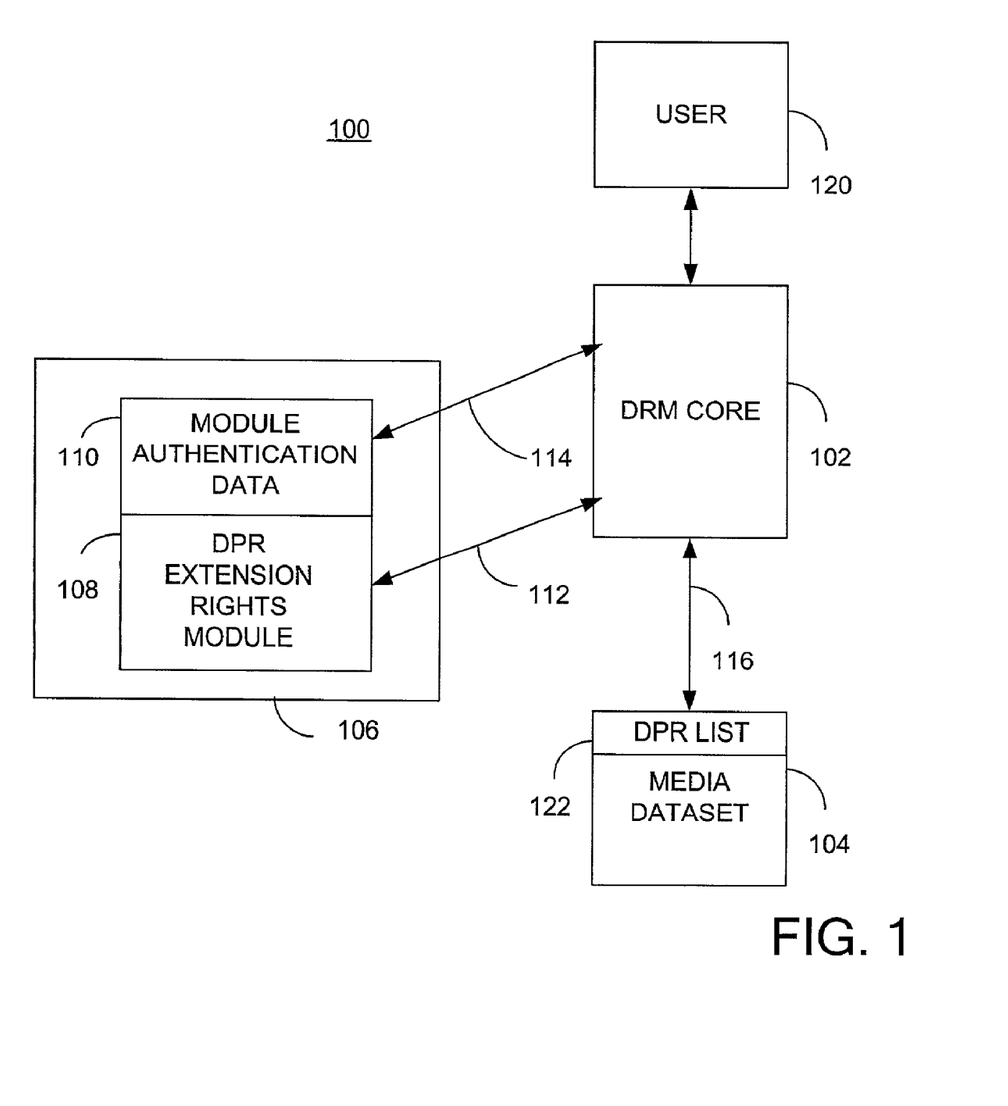
FIG. 1 is a block diagram illustrating the data flow within an example dynamically expanding rights management system in accordance with an example embodiment of the present invention.

An extensible rights manager 100 incorporating an example embodiment of the present invention is illustrated in FIG. 1. The extensible rights manager 100 of the example embodiment includes a rights manager, which is the DRM core 102 in the example embodiment, that is able to utilize associated extension rights control modules to verify or authenticate that usage conditions associated with a requested usage right are satisfied and to control access to a media data set 104 by user 120 or other processes. The example embodiment implements associated extension rights control modules in the form of Digital Property rights (DPR) extensions modules 106. In the operation of the extensible rights manager 100, a data set 104 is received or is otherwise accessed by the DRM Core 102 through interface 116. Interface 116 of the example embodiment is an inter-process communications link if the DRM Core 102 and media data set 104 are resident on a single processor, or interface 116 is a communications interface in embodiments where the DRM core 102 and media data set 104 are contained on different devices. The data set 104 of the example embodiment is encrypted and/or otherwise protected and cannot be accessed by the user 120 or other processing modules upon which the DRM core 102 and/or media data set 104 reside except through access control that is provided by the DRM core 102. Controlling access to data sets such as media data set 104 through a Digital Rights Management system is described in the co-pending non-provisional U.S. Pat. No. 6,226,618 entitled "Electronic content delivery system Method and System", filed Aug. 13, 1998 with inventors Edgar Downs, George Gregory Gruse, Marco Hurtado, Christopher T. Lehman, Kenneth Louis Milsted, Jeffrey B. Lotspiech, commonly assigned herewith to International Business Machines Corporation and is hereby incorporated by reference in its entirety.

Figure 2B:
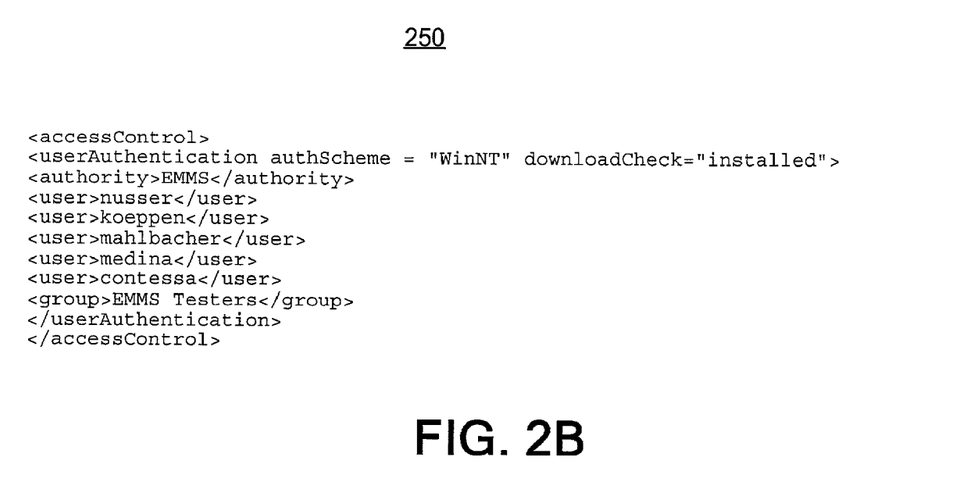
FIG. 2B is an example of a DPR specification, in accordance with an example embodiment of the present invention.

The DRM core 102 of the example embodiment of the present invention is a software module that operates on a processor that also accesses the media data set 104. It is to be noted that in this specification, the term "module" is to be interpreted as broadly as possible and includes, but is not limited to, object code or executable files, executable functions, Dynamic Link Libraries (DLLs) and other processing objects. The media data set 104 of the example embodiment incorporates a list of usage rights, in a DPR list 122, that are able to be granted to the media data set 104. Alternative embodiments of the present invention support delivery and/or retrieval of a DPR list 122 from other sources, including a remote server or database. The DRM core 102 of the example embodiment initially processes the media data set 104 to retrieve the DPR list 122 in order to determine the usage rights that are able to be granted for the media data set 104. The example embodiment of the present invention provides a DPR list 122 for the media data set 104 in a specification that conforms to a rights management language that allows definition of usage rights and usage conditions for access to the data set 104. The example embodiments specify usage rights in a DPR list 122 that conforms to the XML data standard. The DPR list 122 of the example embodiment specifies each allowable usage right, an associated Digital property rights (DPR) module to verify satisfaction of a specified set of usage conditions required for each usage right, and a specification of parameters to be supplied to the DPR modules in order to verify satisfaction of the usage conditions. An example DPR list schema 200 that is an XML schema defining valid DPR modules for a data set 104 is illustrated in FIG. 2A. A valid DPR list 250 that is an XML instance document that conforms to the example DPR list schema 200 is illustrated in FIG. 2B.

It is important to note that although the exemplary embodiment uses the XML as a parse-able mark-up language, other rights management languages such as TCL from ScriptX Corporation or a mark up language known as Policy Maker from AT&T corporation, as well as equivalents, are within the true scope and spirit of the present invention.

A DPR list 122, which is contained within the media data set 104 in the example embodiment, specifies numerous types of usage rights that each requires various usage conditions to be satisfied prior to the granting of that usage right for the media data set 104. Alternative embodiments separately retrieve the DPR list 122 from a server or other remote database, and properly authenticate the retrieved DPR list 122 to ensure its validity. Compliance with the specified set of usage conditions for a particular usage right to the media data set 104 is verified by a DPR module that is associated with that usage right. The example embodiments utilize DPR modules which are software processing modules configured to verify compliance with a set of usage conditions that comprise zero or more usage conditions that are required to be satisfied in order to be granted a particular usage right. The example embodiments utilize a DRM core 102 that incorporate a basic set of DPR modules that verify or authenticate that the set of usage conditions that are required to be satisfied for the fundamental types of usage rights for a media data set 104. The DPR list 122 also specifies alternative usage rights that depend upon processing that is not included in the DRM core 102 to verify the satisfaction of the set of usage conditions necessary for granting those alternative usage rights. The example embodiment accesses an associated extension rights control module, which is a DPR extension module 106 in the example embodiment, in order to verify the satisfaction of the set of usage conditions that is required to grant the alternative usage right for the media data set 104.

The DRM core 102 of the example embodiment maintains the integrity of the access control system by validating each DPR extension module 106 prior to using that particular DPR extension module 106. The DPR extension module 106 of the example embodiment includes a DPR extension rights module 108 and module authentication data 110. The DPR extension rights module 108 of the example embodiment control processing that determines if the required set of usage conditions is satisfied and therefore whether the usage right that is associated with that DPR extension rights module 108 should be granted. The module authentication data 110 of the example embodiment includes data used by the DRM Core 102 to authenticate the DPR extension module 106. The DRM Core 102 verifies the authenticity of each DPR extension module 106 in order to preclude utilizing counterfeit or modified DPR extension modules. If the DRM core 102 of the example embodiment is not able to authenticate a DPR extension module 106, that DRM extension module 106 is not used by the DRM Core 102. The exemplary embodiment performs DPR extension module validation by incorporating a Secure Authentication Channel (SAC) system. SAC technology in general is further described in the co-pending non-provisional U.S. patent application Ser. No. 09/658,218 now [Pending], entitled "Software Secure Authenticated Channel", filed on Sep. 8, 2000 with inventors Jeffrey B. Lotspiech and Stefan Nusser, commonly assigned herewith to International Business Machines Corporation and is hereby incorporated by reference in its entirety. Alternative embodiments use other module authentication mechanisms to ensure the authenticity of DRM extension rights modules 108.

Figure 3:
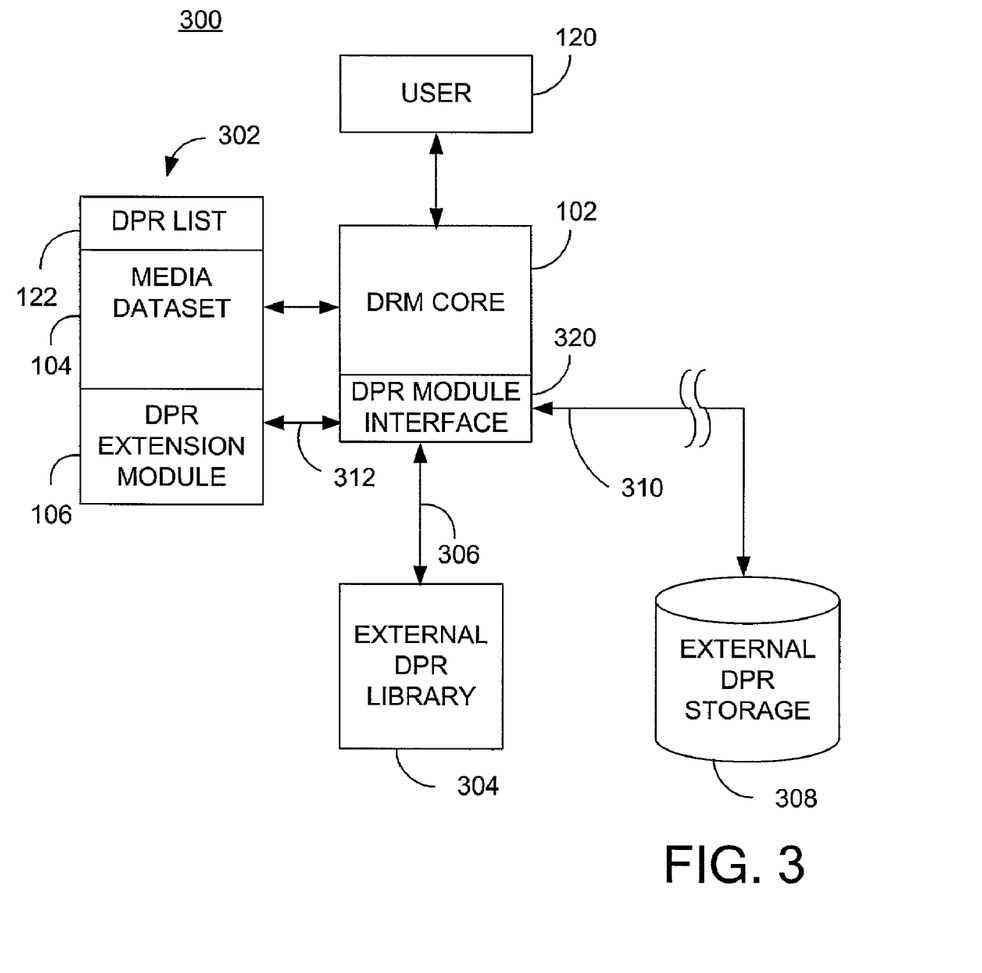
FIG. 3 is a block diagram showing a dynamically expanding rights management system which accesses extension rights modules from multiple sources, according to an example embodiment of the present invention.

An example DPR extension module connection diagram 300 is illustrated in FIG. 3. The DRM Core 102 of the example embodiment is able to access DPR extension modules 106 that are stored in a variety of locations. The DPR extension module connection diagram 300 illustrates a DRM core 102 that controls access to a media data set 104. The type of media data set 104 controlled by the example embodiment is any of a wide variety of data types, including audio, video, a database, or any other type of data. The media data object 104 of the example embodiment contains or references a Digital Property Rights (DPR) list 122, which identifies each type of usage right that a user 120 is able to request. The DPR list 122 of the example embodiment utilizes a list in an XML format, which identifies each usage right that is able to be granted to the media data set 104, along with the parameters that must be provided to the DPR module that will verify the user's satisfaction of the set of usage conditions that must be satisfied for that usage right.

The DRM core of the example embodiment accepts an access request from a user 120 for a type of usage of the media data set 104. The usage right for access that is requested by the user 120 in the example embodiment is able to fall into a variety of categories. Examples of the usage rights that are authorized by the example embodiments include a one-time usage right for access as a sample of the media, a usage right for access to a portion of the media or for a usage right for access which will only be granted for a specified time period, such as a number of weeks. The type usage rights which are granted by the example embodiment vary widely and the type of usage rights that are able to be granted are expanded by the addition of associated extension rights control modules, such as DPR extension modules 106.

Once the DRM core 102 has loaded the DPR list 122 from the media data set 104 or a remote location, the DRM core 102 of the example embodiment reduces the DPR list 122 into an internal format which is more efficiently stored within and accessed by the processing of the DRM core 102. Alternative embodiments do not reduce the DPR list 122 to an internal format and operate from the DPR list 122 in its original format or in another format determined by the embodiment. The DPR list 122 is stored in the example embodiment until a user 120, or other processing module, requests a usage right to the media data set 104. In response to a usage right request, the DRM core 102 first checks to see if one of the DPR modules that is a part of the DRM core 102 is the DPR module that authorizes the requested usage right. If the requested usage right may not be handled by a DPR module that is part of the DRM core 102, the DPR module interface 320 of the example embodiment searches for a associated extension rights control module, such as the DPR extension module 106 of the example embodiment, that provides authorization for the requested usage right. The DRM core 102 of the example embodiment is able to access DPR extension modules 106 that are stored in a variety of locations. The DPR extension module connection diagram 300 illustrates three example sources for DPR extension modules in addition to DPR modules which are already a part of the DRM core 102. The DPR extension modules 106 are all stored in a single source in a particular embodiment, but the DRM core 102 of the example embodiment is sufficiently flexible to operate simultaneously with DPR extension modules that are stored in more than one location. It is also obvious that other storage options for DPR extension modules 106 are used in conjunction with or in place of the example storage locations shown in the DPR extension module connection diagram 300.

One source for DPR extension modules 106 in the example embodiment is a combination media/DPR package 302. An example combination media/DPR data package 302 is illustrated in FIG. 3 and comprises the media data set 104 that contains the data to be accessed and also contains a DPR extension module 106. The DPR list 122 contains a specification of usage rights that are able to be granted for the dataset. The DPR list 122 of the combination media/DPR package 302 includes the usage right that is associated with the DPR extension module 106 that is part of the combination media/DPR package 302. If a user 120 or other process requests a usage right that is authenticated by a DPR extension module that is part of a combination media/DPR package 302, the DRM core 102 utilizes the DPR extension module 106 that is part of the combination media/DPR package 302 to authenticate the usage right. The DPR module interface 320 establishes a combination package DPR interface 312 with the DPR extension module 106 contained within the combination media/DPR package 302. The combination media/DPR package interface 312 is used to validate the DPR extension module, such as via an SAC system as is used in the example embodiment or other authentication mechanism, as well as to provide the authentication request and receive either an affirmative or negative response to the authentication request.

An alternative storage area for DPR extension modules is in an external DPR library 304. The external DPR library 304 of the example embodiment is stored on or accessed through the same device which provides a host for the DRM core 102. The external DPR library 304 contains one or more DPR extension modules 106. The DPR module interface 320 is configured to use an external DPR library interface 306 with the external DPR library 304 in order to validate the DPR extension module 106 that is chosen for use as well as to communicate the authorization request and receive an affirmative or negative authorization for the usage right request. The external DPR library 304 is able to be stored in a device that is part of the device that hosts the DRM core 102, or the external DPR library 304 is able to be stored on a removable device, such as a removable memory device, floppy disk or other removable storage media.

The DPR module interface 320 may also access DPR extension modules within an external DPR storage 308. In one embodiment, a DRM core 102, through its DPR module interface 320, communicates with one or more external devices that are external DPR storage 308 units. The DPR module interface 320 communicates with an external DPR storage 308 through an external DPR storage interface 310. In one embodiment, the external DPR storage is located remotely from the processor hosting the DRM core module, and the external DPR storage interface 310 includes a remote connection using telephone lines, radio, satellite or other communications means known to practitioners in the relevant arts. The DPR storage interface 310 is used to validate the DPR extension modules 106 within the external DPR storage 308, communicate an authorization request and receive either an affirmative or negative authorization for the requested usage right.

Alternative embodiments of the present invention allow extension DPR modules 106 to be installed prior to a usage rights request by a user 120. These embodiments allow the DRM core 102 to access and install a specified DPR extension module 106. A DPR extension module 106 in these embodiments are installed in response to a command by the user 120 to install the DPR module 106 or in response to an external command received by the DRM core 102. External commands are received by the DRM Core 102 in some embodiments through communications interfaces with remote servers or other entities in communications with the DRM core 102. The DPR extension modules that are installed in response to a command are retrieved from one or more of a variety of storage locations, including the storage locations described above.

Figure 4:
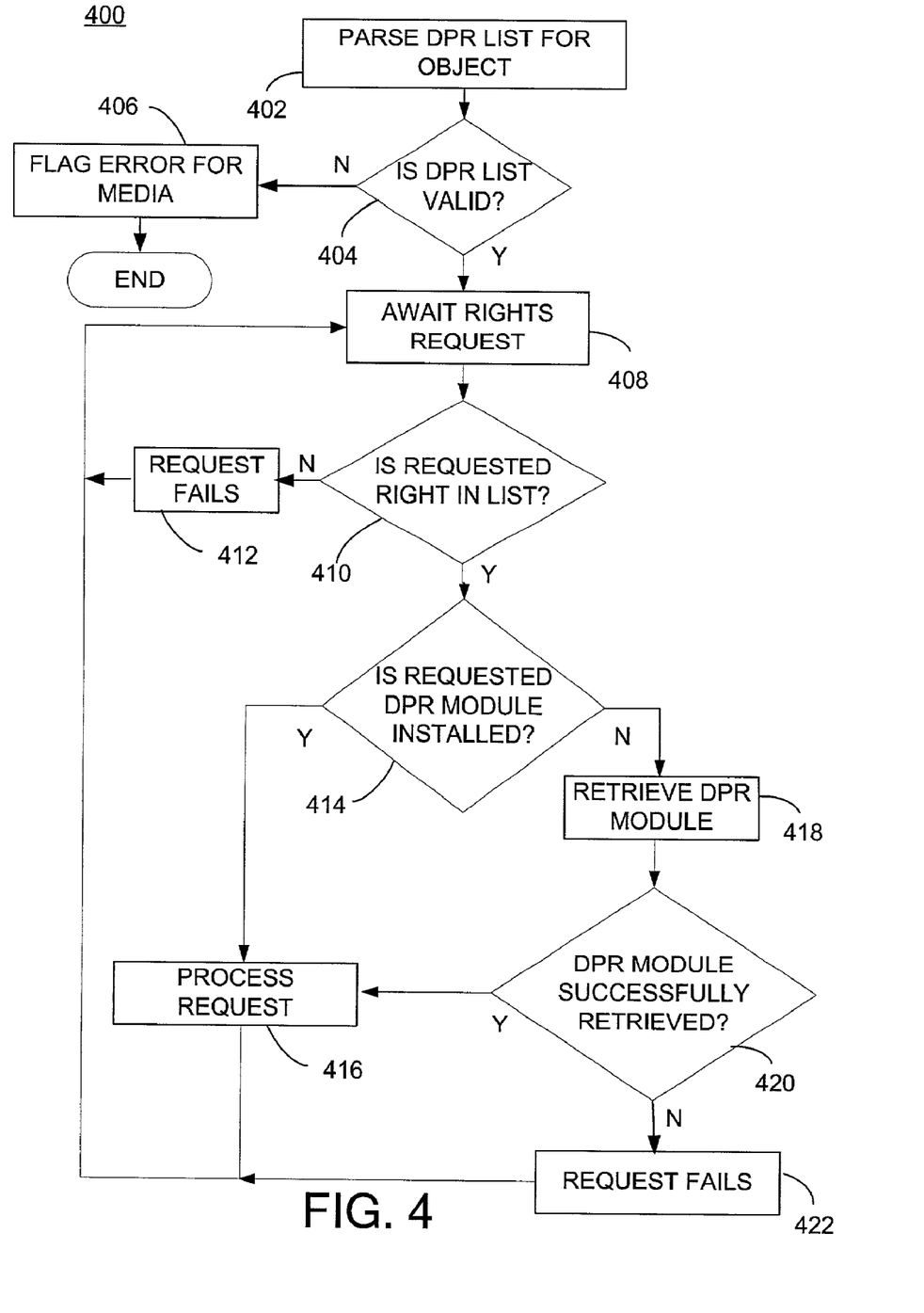
FIG. 4 is an operational flow diagram illustrating an operational sequence for the system of FIG. 1, according to an example embodiment of the present invention.

An example embodiment's DRM core processing flow 400 that is performed by an exemplary DRM core 102 upon receipt of or initializing access to a media data set 104 is illustrated in FIG. 4. The processing associated with controlling the access to a single media data set 104 is described below for simplicity. The example embodiment of the present invention is able to control access to multiple media data sets 104, which may or may not be simultaneously accessible to the DRM core 102.

The processing of the DRM core 102 begins, in step 402, with processing to parse DPR list for object. The parse DPR list for object step 402 reads or retrieves the DPR list 122 that is associated with the media data set 104 and parses the data contained in the DPR list 122. The DPR list 122 associated with the media data set 104 specifies the types of usage right which are granted for the media data set, a DPR module which verifies that the required set of usage conditions is satisfied for the requested usage right for the media data set 104 and a list of parameters which are required to be passed to the DPR module in order to support determining if the set of usage conditions is satisfied for that usage right.

The processing in step 402 of the example embodiment of the present invention reformats the DPR list 122 data for more efficient storage and retrieval by the DRM core 102 and stores that information in an internal data structure. Alternative embodiments do not reformat the DPR list 122 and store the DPR list 122 for direct use. The example embodiment of the preferred invention utilizes the XML format to store DPR lists 122 in the media data set 104.

Once the DPR list 122 has been parsed, in step 402, the processing advances to step 404 to validate the XML formatting of the DPR list 122 retrieved from the media data set 104. The processing of step 404 in the example embodiment validates the format of the DPR list 122 against a DPR list schema, and does not validate that the DPR list 122 specifies valid or authentic DPR modules or that the specification of parameters to provide to the DPR modules is correct. The XML formatting language utilized by the example embodiment utilizes a structure that allows checking of formatting of the XML schema and validates the DPR list 122 against that schema. If a DPR list 122 is not properly formatted, the processing determines the formatting error and further processing does not use the erroneous DPR list 122. If the DPR list is determined to be improperly formatted, the processing advances to step 406 wherein an error is flagged for that media data set 104 and the processing for this media data set 104 stops. If the retrieved DPR list 122 is validated against the DPR list schema, processing continues with step 408 to await a request for a digital property right, such as an access request for data within the media data set 104.

The processing of step 408 waits for an access request for the media data set 104 with which the retrieved DPR list 122 is associated. The access request is able to be one or more of read, write, or exercise of any digital property right. The user 120 or another process on the same or different processor as is hosting the DRM core 102 of the example embodiment is able to originate an access request. Following the receipt of an access request by the DRM core 102, the DRM core processing 400 advances to step 410 where the DRM core 102 determines if the requested usage right associated with the access request is specified in the DPR list 122 that was retrieved in step 402. If the usage right for the requested access is not included in the DPR list 122 for the media data set 104, the processing advances to step 412 wherein the access request fails. The processing then returns to step 408 to await a further access request.

If the requested usage right is in the DPR list 122 that was retrieved from or is otherwise associated with the subject media data set 104, the processing advances to step 414 to determine if the DPR module that corresponds to the requested usage right is already installed in the DRM core 102. Installed DPR modules in the example embodiment include basic DPR modules that are included in the DRM core 102. A DPR extension module 106 is able to be already installed if that DPR module has been previously accessed and retained by the DRM core 102. An alternative embodiment of the DRM core 102 allows external DPR modules 106 to be explicitly or implicitly installed in order to expand the processing efficiency of the DRM core 102.

If the processing of step 414 determines that the DPR module is not installed, the processing advances to step 418 to retrieve the DPR module associated with the requested usage right. The DPR list 122 retrieved from or otherwise associated with the media data set 104 specifies the usage rights which are authorized for that media data set 104. The DPR module interface 320 scans the possible locations for DPR external modules 106 as described above or other locations that are configured within the particular embodiment.

The processing then advances to step 420 wherein the processing determines if the DPR extension module 106 was successfully retrieved. Verifying the successful retrieval of the DPR extension module 106 in the example embodiment includes verifying that a corresponding DPR extension module 106 was located in one of the locations from which DPR modules is retrieved and also includes verifying that the DPR extension module 106 was authenticated through means of an authentication process or extension rights control module verifier that is used by the particular embodiment. The example embodiment utilizes a Secure Authentication Channel (SAC) system as an extension rights control module verifier to authenticate DPR modules. Other embodiments utilize other module authentication schemes and mechanisms.

If the DPR extension module 106 is not successfully retrieved, the processing advances to step 422 wherein the processing handles the failed request. In the case of unsuccessful retrieval of the DPR extension module 106 that is required to verify satisfaction of the usage conditions required for granting the requested usage right, the example embodiment does not perform any processing to determine if the requested usage right is to be granted. This improves the security and the processing efficiency of the example embodiments. After noting the failure of the requested access, the processing of the example embodiment returns to step 408 to await another access request.

If the processing of step 420 determines that the required DPR extension module 106 has been successfully retrieved or if the processing of step 414 determined that the required DPR module is already installed, the processing of the example embodiment advances to step 416 to perform the processing to determine if the required set of usage conditions is satisfied to permit authorizing the requested access. The zero or more usage conditions within the set of usage conditions which are required to be satisfied for a requested usage right to be granted is dependent upon the usage right requested and are defined by the provider of the DPR module. The processing of the DPR module that verifies satisfaction of these usage conditions defines what those usage conditions are as well as the required state of those usage conditions. The DPR list 122 contained within the media data set 104 specifies any parameters which are to be provided to the DPR module 106 in order to support granting the usage right.

If the processing of step 416 determines that the required set of usage conditions is satisfied, an affirmative authorization for the requested usage right is returned and the requested access to the media data set 104 is granted. If the processing of step 416 determines that the required usage conditions are not satisfied, the requested usage right is not granted, the requested access is denied and processing then returns to step 408 to await a further access request.

Figure 5:
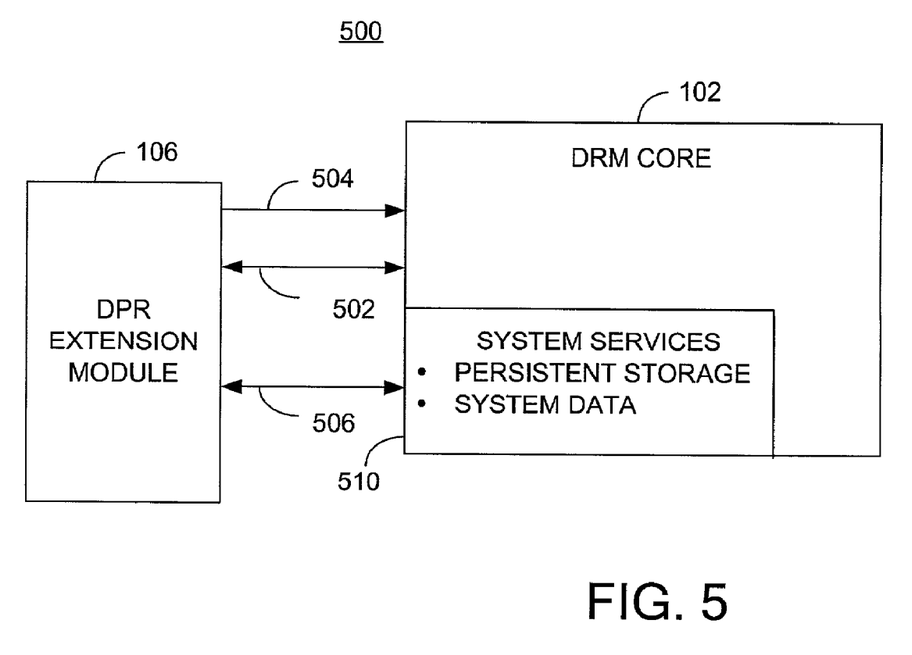
FIG. 5 is a data flow diagram illustrating the communications between a core rights manager and an extension rights verification module, according to an example embodiment of the present invention.

The DRM Extension Module Interface 500 of the example embodiment is illustrated in FIG. 5. The DRM extension module interface 500 illustrates the data communication interfaces between the DPR extension module 106 and the DRM core 102. The example embodiment implements a DRM core 102 which contains a system services module 510 that provides trusted services to the DRM extension modules that are used by the example embodiment. The DPR list 122 obtained from or associated with the media data set 104 specifies the DPR modules that are used to verify compliance with the requisite usage conditions for each DPR that is able to be granted for the media data set 104. The following description illustrates the operation of a DPR extension module 106. The DRM core 102 communicates a usage rights verification request 502 to the DPR extension module 106. The usage rights verification request of the example embodiment contains a specification of the usage right, which is requested by a user 120 or other mechanism, a specification of the media data set 104 which is the object of the usage rights request, and the parameters which were specified by the DPR list 122 for authenticate that usage right.

In one embodiment, the DPR extension module 106 utilizes system services provided by the DRM core 102. The DRM core 102 of the example embodiment provides trusted system services through a system service module 510 which is accessed by the DPR extension module through the bi-directional system services interface 506. System services module 510 is a trusted software component that provides authenticated data or retrieves data from a remote trusted server. Examples of the system services that are provided by the system services module 510 of the example embodiment are system data, such as a processor or product identification number, processor time, time of day and/or current day and date. The system services module 510 of the example embodiment also provides persistent and protected data storage in order to allow a DPR extension module to securely store data in persistent data storage. An example of persistently stored data includes storing the number of accesses which have been authorized for a particular media data set 104 by a DPR extension module which will authorize a limited number of accesses to a media data set 104. The processing of the DPR extension module 106 determines whether the requested usage right is to be granted or denied based upon the supplied parameters and/or data obtained from the system services module 510. The example embodiment provides persistent and protected data storage through encryption of the stored data into a non-volatile memory device. The authorization result 504, which contains the result of the decision to grant or deny authorization for the requested usage right, is then communicated to the DRM core 102. Based upon the results of the grant/deny decision of the DPR extension module 106, the DRM core 102 will grant or deny the requested access to the media data set 104. The DRM core 102 of the example embodiment grants access to the data in the media data set 104 by, for example, allowing decryption of the data within the media data set 104.

The present invention can be realized in hardware, software, or a combination of hardware and software. A system according to a preferred embodiment of the present invention can be realized in a centralized fashion in one computer system, or in a distributed fashion where different elements are spread across several interconnected computer systems.

Any kind of computer system—or other apparatus adapted for carrying out the methods described herein—is suited. A typical combination of hardware and software could be a general purpose computer system with a computer program that, when being loaded and executed, controls the computer system such that it carries out the methods described herein.

The present invention can also be embedded in a computer program product, which comprises all the features enabling the implementation of the methods described herein, and which—when loaded in a computer system—is able to carry out these methods. Computer program means or computer program in the present context mean any expression, in any language, code or notation, of a set of instructions intended to cause a system having an information processing capability to perform a particular function either directly or after either or both of the following a) conversion to another language, code or, notation; and b) reproduction in a different material form.

Each computer system may include, inter alia, one or more computers and at least a computer readable medium allowing a computer to read data, instructions, messages or message packets, and other computer readable information from the computer readable medium. The computer readable medium may include non-volatile memory, such as ROM, Flash memory, Disk drive memory, CD-ROM, and other permanent storage. Additionally, a computer medium may include, for example, volatile storage such as RAM, buffers, cache memory, and network circuits. Furthermore, the computer readable medium may comprise computer readable information in a transitory state medium such as a network link and/or a network interface, including a wired network or a wireless network, that allow a computer to read such computer readable information.

Although specific embodiments of the invention have been disclosed, those having ordinary skill in the art will understand that changes can be made to the specific embodiments without departing from the spirit and scope of the invention. The scope of the invention is not to be restricted, therefore, to the specific embodiments, and it is intended that the appended claims cover any and all such applications, modifications, and embodiments within the scope of the present invention.

What is claimed is:

1. A method for controlling access to a data set, the method on a computer system comprising:
   retrieving a digital property rights list identifying at least a first associated digital property rights module and at least a second associated digital property rights module, wherein the at least first associated digital property rights module resides in a Digital Rights Management core, and wherein the at least second associated digital property rights module is an associated extension rights control module that is separate from the Digital Rights Management core;
   retrieving, in response to the associated extension rights control module not being installed, the associated extension rights control module specified in the digital property rights list for generating an authorization for a desired type of access to a data set, wherein the associated extension rights control module verifies that a set of usage conditions associated with the desired type of access has been satisfied;
   wherein upon the retrieving of the associated extension rights control module, the Digital Rights Management core performs the following:
   requesting the authorization for the desired type of access to the data set through the associated extension rights control module;
   receiving the authorization from the associated extension rights control module if the set of usage conditions for the desired type of access is satisfied; and
   granting, in response to receipt of the authorization, the desired type of access to the data set.

2. The method of claim 1, further comprising authenticating the associated extension rights control module.

3. The method of claim 1, wherein the data set comprises at least one of a multi-media presentation, an audio program, a database and a document data set.

4. The method of claim 1, wherein the associated extension rights control module is installed prior to the step of requesting.

5. The method of claim 1, wherein the associated extension rights control module is located in at least one of the data set, a remote device and an external Digital Property Rights library.

6. A method, in a Digital Rights Management core, for controlling access to a data set, the method comprising:
   accepting a rights request to a data set, wherein the data set is associated with a digital property rights list specified in a rights management language, wherein the digital property rights list identifies at least a first associated digital property rights module and at least a second associated digital property rights module, wherein the at least first associated digital property rights module resides in the Digital Rights Management core, and wherein the at least second associated digital property rights module is an associated extension rights control module that is separate from the Digital Rights Management core;
   determining if the rights request is contained within the digital property rights list;
   determining if the associated extension rights control module is required to authorize a requested right that is specified by the rights request;
   retrieving the associated extension rights module in response to a determination that the associated extension rights control module is required, wherein the associated extension rights module verifies that a set of usage conditions associated with the rights request has been satisfied;
   requesting an authorization for the requested right from the associated extension rights module;
   receiving the authorization from the associated extension rights control module if the set of usage conditions for the desired type of access is satisfied; and
   granting the desired type of access to the data set in response to the authorization.

7. The method of claim 6, further comprising validating the digital property rights list.

8. The method of claim 6, further comprising authenticating the associated extension rights control module.

9. The method of claim 6, wherein the rights management language is the XML markup language.

10. A system for controlling access to a data set, the system comprising:
    an associated extension rights control module, the associated extension rights control module being identified in a digital property rights list that also identifies a digital property rights module residing in a Digital Rights Management core, wherein the associated extension rights control module is separate from the Digital Rights Management core and generates an authorization for a desired type of access to a data set if a set of usage conditions for the desired type of access is satisfied, wherein the authorization is generated based on the associated extension rights module verifying that a set of usage conditions associated with the desired type of access has been satisfied; and a rights manager which
   requests the authorization for the desired type of access to the data set through the associated extension rights control module,
   receives the authorization from the associated extension rights control module if the set of usage conditions for the desired type of access is satisfied, and
   grants, in response to receipt of the authorization, the desired type of access to the data set.

11. The system of claim 10, further comprising an extension rights control module verifier for authenticating the associated extension rights control module.

12. The system of claim 10, wherein the data set comprises at least one of a multi-media presentation, an audio program, a database and a document data set.

13. The system of claim 10, wherein the associated extension rights control module is loaded prior to a request for the desired type of access.

14. The system of claim 10, wherein the associated extension rights control module is located in at least one of a file containing the data set, a remote device and a downloadable module.

15. A system for controlling access to a data set, the system comprising:
   an associated extension rights control module, wherein the associated extension rights generates an authorization for a desired type of access to a data set if the associated extension rights control module verifies that a set of usage conditions for the desired type of access is satisfied; and
   a rights manager for:
      accepting a rights request to a data set, wherein the data set comprises a digital property rights list specified in a rights management language, wherein the digital property rights list identifies at least the associated extension rights control module and a digital property rights module, and wherein the associated extension rights control module is separate from a Digital Rights Management core and the digital property rights module resides in the Digital Rights Management core;
      determining if the rights request is contained within the digital property rights list;
      determining if the associated extension rights control module is installed within the rights manager;
      retrieving the associated extension rights module in response to a determination that the associated extension rights control module is required;
      requesting an authorization for the requested right from the associated extension rights module;
      receiving the authorization from the associated extension rights control module if the set of usage conditions for the desired tvne of access is satisfied; and
      granting the desired type of access to the data set in response to the authorization.

16. The system of claim 15, wherein the rights manager further verifies the digital property rights list.

17. The system of claim 15, wherein the rights manager further verifies the associated extension rights control module.

18. The system of claim 15, wherein the rights management language is the XML markup language.

19. A machine-readable medium encoded with a program for controlling access to a data set, the program containing instructions for performing the steps of:
   retrieving a digital property rights list that identifies at least a first associated digital property rights module and at least a second associated digital property rights module, wherein the at least first associated digital property rights module resides in a Digital Rights Management core, and wherein the at least second associated digital property rights module is an associated extension rights control module that is separate from the Digital Rights Management core;
   retrieving, in response to the associated extension rights control module not being installed, the associated extension rights control module specified in the digital property rights list for generating an authorization for a desired type of access to a data set, wherein the associated extension rights control module verifies that a set of usage conditions associated with the desired type of access has been satisfied;
   wherein upon the retrieving of the associated extension rights control module, the Digital Rights Management core performs the following:
      requesting the authorization for the desired type of access to the data set through the associated extension rights control module;
      receiving the authorization from the associated extension rights control module if the set of usage conditions for the desired type of access is satisfied; and
      granting, in response to receipt of the authorization, the desired type of access to the data set.

20. The computer readable medium of claim 19, further comprising the step of authenticating the associated extension rights control module.

21. The computer readable medium of claim 19, wherein the data set comprises at least one of a multi-media presentation, an audio program, a database and a document data set.

22. The computer readable medium of claim 19, wherein the associated extension rights control module is installed prior to performing the step of requesting.

23. The computer readable medium of claim 19, wherein the associated extension rights control module is located in at least one of a file containing the data set, a remote device and a downloadable module.

24. A machine-readable medium encoded with a program for controlling access to a data set by a Digital Rights Management core, the program containing instructions for performing the steps of:
   accepting a rights request to a data set, wherein the data set comprises a digital property rights list specified in a rights management language, wherein the digital property rights list identifies at least the associated extension rights control module and a digital property rights module, and wherein the associated extension rights control module is separate from a Digital Rights Management core and the digital property rights module resides in the Digital Rights Management core;
   determining if the rights request is contained within the digital property rights list;
   determining if the associated extension rights control module is required to authorize a requested right specified by the rights request;
   retrieving the associated extension rights module in response to a determination that the associated extension rights control module is required, wherein the associated extension rights module verifies that a set of usage conditions associated with the rights request has been satisfied;

requesting an authorization for the requested right from the associated extension rights module;

receiving the authorization from the associated extension rights control module if the set of usage conditions for the desired type of access is satisfied; and granting the desired type of access to the data set in response to the authorization.

25. The computer readable medium of claim 24, further comprising the step of validating the digital property rights list.

26. The computer readable medium of claim 24, further comprising the step of authenticating the associated extension rights control module.

27. The computer readable medium of claim 24, wherein the rights management language is the XML markup language.

* * * * *